(12) United States Patent
Gunasekara et al.

(10) Patent No.: US 8,421,592 B1
(45) Date of Patent: Apr. 16, 2013

(54) MEDIATION OF ELECTRIC VEHICLE CHARGING BY WIRELESS NETWORK PROVIDER

(75) Inventors: Don J. Gunasekara, Reston, VA (US); Thomas H. Wilson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1216 days.

(21) Appl. No.: 12/251,659

(22) Filed: Oct. 15, 2008

(51) Int. Cl.
*H04Q 9/00* (2006.01)
*G05B 23/00* (2006.01)
*H04M 3/00* (2006.01)
*H02J 7/14* (2006.01)

(52) U.S. Cl.
USPC ............ 340/5.74; 340/5.8; 455/420; 320/104

(58) Field of Classification Search .................. 340/5.74, 340/5.8; 455/400–466; 320/104
See application file for complete search history.

(56) References Cited

U.S. PATENT DOCUMENTS

| | | | |
|---|---|---|---|
| 5,327,066 A * | 7/1994 | Smith | 320/109 |
| 5,461,299 A | 10/1995 | Bruni | |
| 5,684,379 A | 11/1997 | Svedoff | |
| 6,380,637 B1 | 4/2002 | Hsu et al. | |
| 6,673,479 B2 | 1/2004 | McArthur et al. | |
| 6,727,809 B1 | 4/2004 | Smith | |
| 7,693,609 B2 * | 4/2010 | Kressner et al. | 700/291 |
| 7,747,739 B2 * | 6/2010 | Bridges et al. | 709/224 |
| 7,949,435 B2 * | 5/2011 | Pollack et al. | 700/291 |
| 8,013,570 B2 * | 9/2011 | Baxter et al. | 320/109 |
| 2005/0159133 A1 * | 7/2005 | Hasan et al. | 455/406 |
| 2007/0131505 A1 | 6/2007 | Kim | |
| 2008/0228613 A1 * | 9/2008 | Alexander | 705/35 |
| 2008/0281663 A1 * | 11/2008 | Hakim et al. | 705/8 |
| 2009/0229900 A1 * | 9/2009 | Hafner et al. | 180/65.275 |

\* cited by examiner

*Primary Examiner* — Daniel Wu
*Assistant Examiner* — Mohamed Barakat

(57) ABSTRACT

A recharging station for recharging an electric vehicle has a fixed transceiver operable with a local interface and a wide-area wireless interface, wherein the wide-area wireless interface corresponds to a cellular network provider. A user transceiver is activated by a user to send an authentication request to the recharging station via the local interface. A front-end server in a core network of the cellular network provider communicates with the recharging station and the user transceiver. The recharging station forwards the authentication request with an identification of the recharging station to the front-end server, and the front-end server creates a PIN code in response to the authentication request if the identification of the user transceiver is verified. A back-end server associated with the utility provider receives the PIN code and verifies the identification of the recharging station. The front-end server sends the PIN code to both the user transceiver and the recharging station via the wide-area wireless interface, and the PIN code is used to initiate charging.

20 Claims, 5 Drawing Sheets

MEDIATION OF ELECTRIC VEHICLE CHARGING BY WIRELESS NETWORK PROVIDER

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to recharging of electric vehicles at remote recharging stations, and, more specifically, to coordination between a utility provider and a cellular telephone provider for handling activation and billing for recharging services.

The number of electric vehicles, such as battery-powered cars, in use on public roadways is increasing due to energy-related and pollution control issues. In order to support a large fleet of electric vehicles, widespread availability is needed for recharging stations to remotely charge vehicles when away from home. Deployment of recharging outlets/stations depends on the ability of an owner or operator of the recharging station to receive compensation from users who charge their vehicles at the respective power outlets. Recharging stations can be built to accept cash or credit payments, but this requires the driver/user to be always prepared with such cash or a credit card. It is also costly to implement for the owner/operator of the outlet because of the added hardware and intelligence to handle such payments. Individual recharging stations may or may not be owned and operated by the electric power company itself. When operated by the power company, there may not be other facilities or personnel at a recharging outlet for handling payment. Some businesses such as parking garages may desire to install outlets for use by customers, and many would prefer to allow the user to pay the electric power company directly (whether or not such business gets a portion of what the user pays). Thus, it would be desirable to provide a universal access and billing method for recharging of electric vehicles at remote recharging stations.

SUMMARY OF THE INVENTION

The present invention provides a recharging system that employs a user's cellular phone to authorize access to a recharging station and the cellular network's billing system to generate payment to the operator of the recharging station. Consequently, complicated hardware in the recharging station is avoided while making the transaction simple and convenient for the user.

In one aspect of the invention, a system for recharging an electric vehicle, comprises a recharging station having a fixed transceiver operable with a local interface and a wide-area wireless interface, wherein the wide-area wireless interface corresponds to a cellular network provider, and wherein the recharging station has a controllable output for selectably metering electrical power from a powerline of a utility provider to the electric vehicle for recharging. A user transceiver is operable with the local interface and the wide-area wireless interface, wherein the user transceiver is activated by a user when desiring to recharge the electric vehicle to send an authentication request to the recharging station via the local interface, and wherein the authentication request identifies the user transceiver. A front-end server is provided in a core network of the cellular network provider adapted to communicate with the recharging station and the user transceiver via the wide-area wireless interface, wherein the recharging station forwards the authentication request with an identification of the recharging station to the front-end server, and wherein the front-end server creates a PIN code in response to the authentication request if the identification of the user transceiver is verified. A back-end server is associated with the utility provider having a network interface with the front-end server for receiving the PIN code, wherein the back-end server verifies the identification of the recharging station and sends a confirmation to the front-end server. The front-end server sends the PIN code to both the user transceiver and the recharging station via the wide-area wireless interface. The user transceiver forwards the PIN code to the recharging station via the local interface. When the recharging station compares the PIN code received from the user transceiver with the PIN code received from the front-end server, and if they match then it initiates charging of the electric vehicle.

DETAILED DESCRIPTION OF PREFERRED EMBODIMENTS

Figure 1:
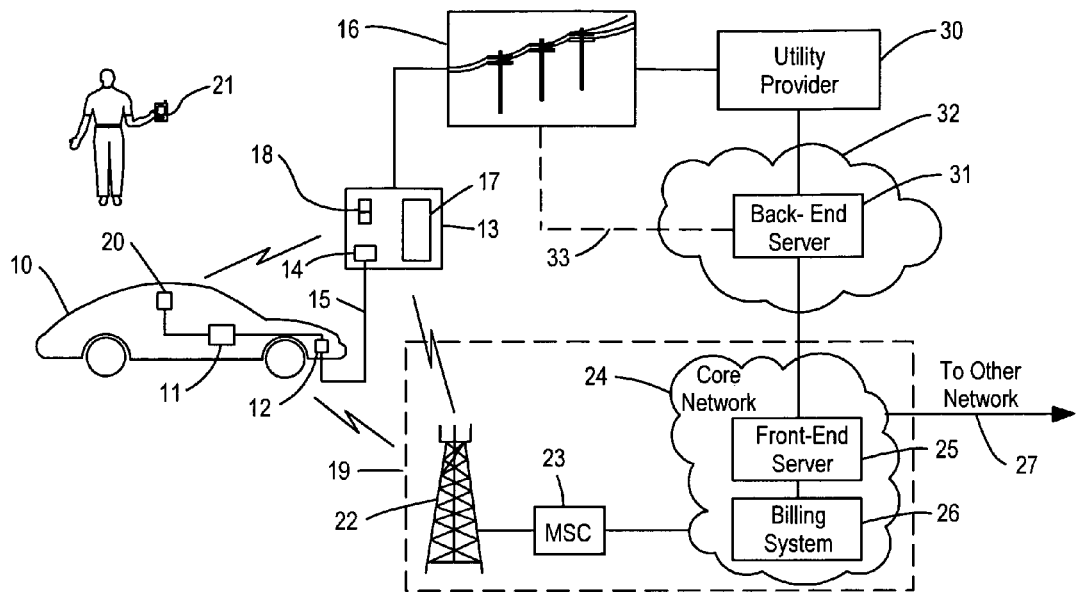
FIG. 1 is a block diagram of a preferred embodiment of the system of the present invention.

FIG. 1 shows one example scenario of the present invention wherein a local interface provides communication between a user transceiver and a recharging station and wherein a wide-area wireless interface allows the recharging station and user transceiver to communicate with servers operated by the cellular network provider and the utility provider to perform authentication and billing for recharging services. An electric vehicle 10 has a recharging system 11 including a recharge connector 12. A recharging station 13 has outlet terminals 14 for interconnecting to recharge connector 12 via a supply line 15. Recharging station 13 receives electric power from a grid 16 which it can meter to electric vehicle 10 after the paying user is authenticated. Recharging station 13 includes an electronics control module 17 and manual control switches 18. Control module 17 includes a local interface for interacting with at least one of user transceivers 20 or 21 and a wide-area wireless interface for interacting with a wireless cellular network 19. Vehicle-mounted cellular transceiver 20 and/or mobile handset transceiver 21 likewise communicate with cellular network 19. In a preferred embodiment, the invention relies on handset 21 and vehicle-mounted transceiver is not present.

Figure 6:
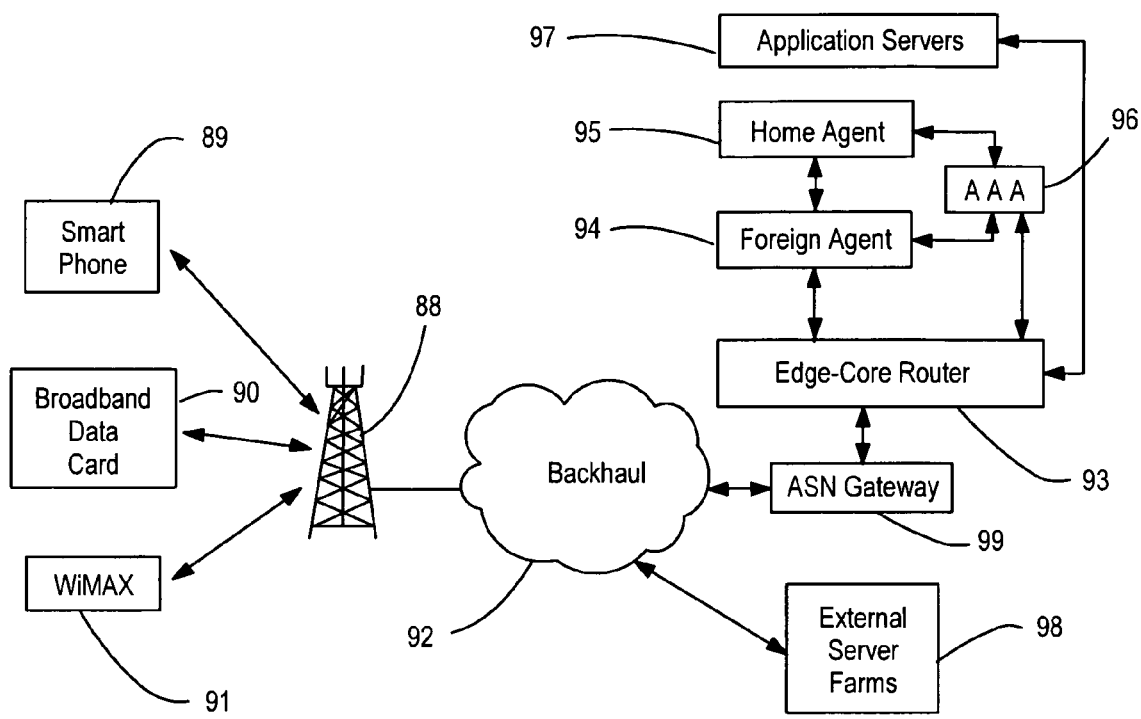
FIG. 6 shows a wireless wide-area architecture useful in the present invention.

Cellular network 19 includes a base transceiver station 22 and a mobile switching center (MSC) 23 coupled to a core network 24. As an alternative to MSC 23, a 3G or 4G wireless data network architecture can be used as shown in FIG. 6. Core network 24 includes a front-end server 25 for performing authentication functions and a billing system 26 for charging usage fees to the user. When the user is not a subscriber of cellular network 19 but is roaming, a gateway 27 may be provided to another cellular provider's network to obtain authentication and billing information.

A utility provider 30 has a back-end server 31 within a network 32 (e.g., a private network, the Internet, or a VPN), which is coupled to core network 24. Utility provider 30 may comprise an electric power company or a reseller of electric power who operates recharging station 13. A broadband-over-power line (BPL) interface 33 can also be provided between network 32 and grid 16 in order to allow direct communication between recharging station 13 and back-end server 31.

In operation, the present invention employs a short range, local interface such as Bluetooth, or Wi-Fi (i.e., IEEE 802.11) to initiate authentication requests when the user desires to recharge vehicle 10. Recharging station 13 uses the wide-area wireless interface of the cellular network to complete the authentication and to ensure proper billing.

Figure 2:
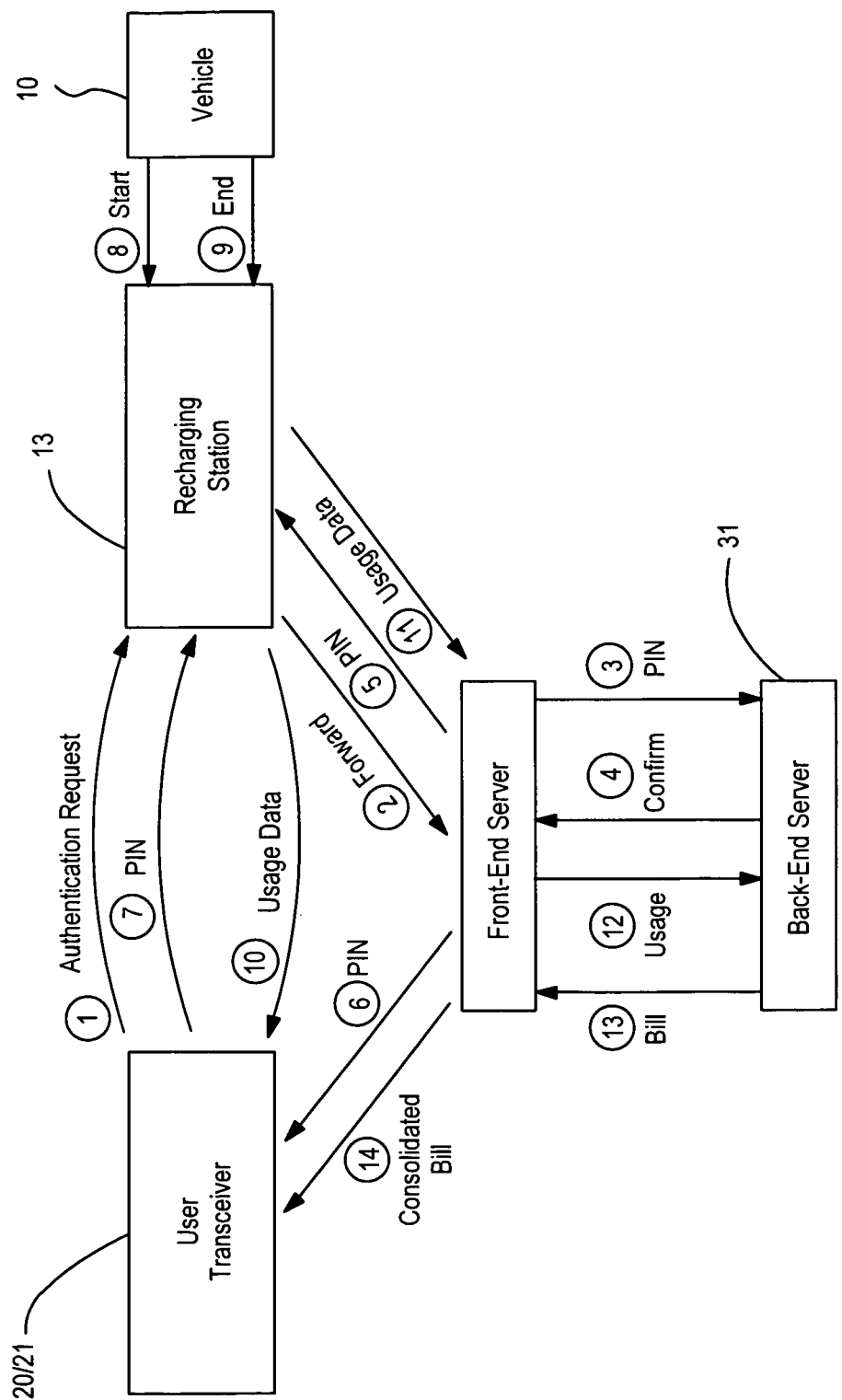
FIG. 2 is a diagram showing a typical interaction of the elements of FIG. 1 during a recharging transaction.

FIG. 2 illustrates a preferred interaction among recharging station 13, user transceiver 20/21, front-end server 25, back-end server 31, and vehicle 10 in a preferred embodiment. In step 1, user transceiver 20/21 discovers the presence of recharging station 13, and, in response to an action taken by the user to indicate a desire to recharge vehicle 10, an authentication request is sent over the local interface to recharging station 13. The authentication request identifies the user transceiver by at least one of an electronic serial number (ESN), a mobile directory number (MDN), mobile station ID (MSID), or media access control (MAC) address of the transceiver. In step 2, recharging station 13 appends an identification of itself to the authentication request and forwards it to front-end server 25. Front-end server 25 determines whether the authentication request properly authenticates user transceiver 20/21 (e.g., according to a user password provided in the request), and if so then generates a PIN code unique to the particular recharging transaction. The PIN code is sent to back-end server 31 in step 3, preferably including an identification of recharging station 13. In step 4, back-end server 31 sends a confirmation to front-end server 25. Confirmation may be withheld by the power utility company if there are problems with the identified recharging station, for example.

After receiving confirmation, front-end server 25 forwards the PIN code in authentication responses sent to both recharging station 13 in step 5 and user transceiver 20/21 in step 6. Preferably, the authentication responses may be sent directly over the wide-area wireless interface. Alternatively, an authentication response intended for one recipient can be forwarded through the other recipient. In another alternative, the authentication response for the recharging station 13 could be sent through the BPL interface as part of the wide-area interface. The authentication responses may include separate copies of the PIN code encoded differently in respective datagrams to be decoded separately by the recharging station and the user transceiver. User transceiver 20/21 confirms that the authentication response properly authenticates front-end server and then forwards the PIN code to recharging station 13 in step 7 as confirmation of the authentication and to initiate charging. Conversion or re-encoding of the PIN code may be required in order to permit recharging station 13 to compare the PIN code received from user transceiver 20/21 with the PIN code received from front-end server 25 to determine a match. If a match is detected, then recharging station 13 initiates charging of electric vehicle 10.

Before initiating charging, recharging station 13 may further check to determine whether vehicle 10 is ready to receive a charge. Readiness may be determined in response to user activation of a manual switch 18 or by electronically detecting interconnection of outlet 14 with recharging system 11. Once readiness is detected, outlet 14 may be activated and charging starts at step 8 in FIG. 2. During charging, recharging station 13 preferably checks for an end of charging by monitoring further manual activation of switches 18, by detecting a drop in current being drawn through recharging station 13, or in response to communication signals from the charging system. The recharging transaction ends at step 9. Based on the measured consumption during recharging, recharging station 13 sends usage data to user transceiver 20/21 in step 10 and to front-end server 25 in step 11. Preferably, the usage data includes the PIN code for identifying the transaction. Front-end server 25 forwards the usage data to back-end server 31 in step 12. Based on the rate in force, back-end server 31 generates a bill in step 13 and forwards it to front-end server 25. In step 14, front-end server 25 bills the cost of the amount of electrical consumption together with an amount for cellular service as a consolidated bill in step 14. Based on collection from the user, the cellular network provider can forward payment to the power utility company or another operator/owner of the recharging station.

Figure 3:
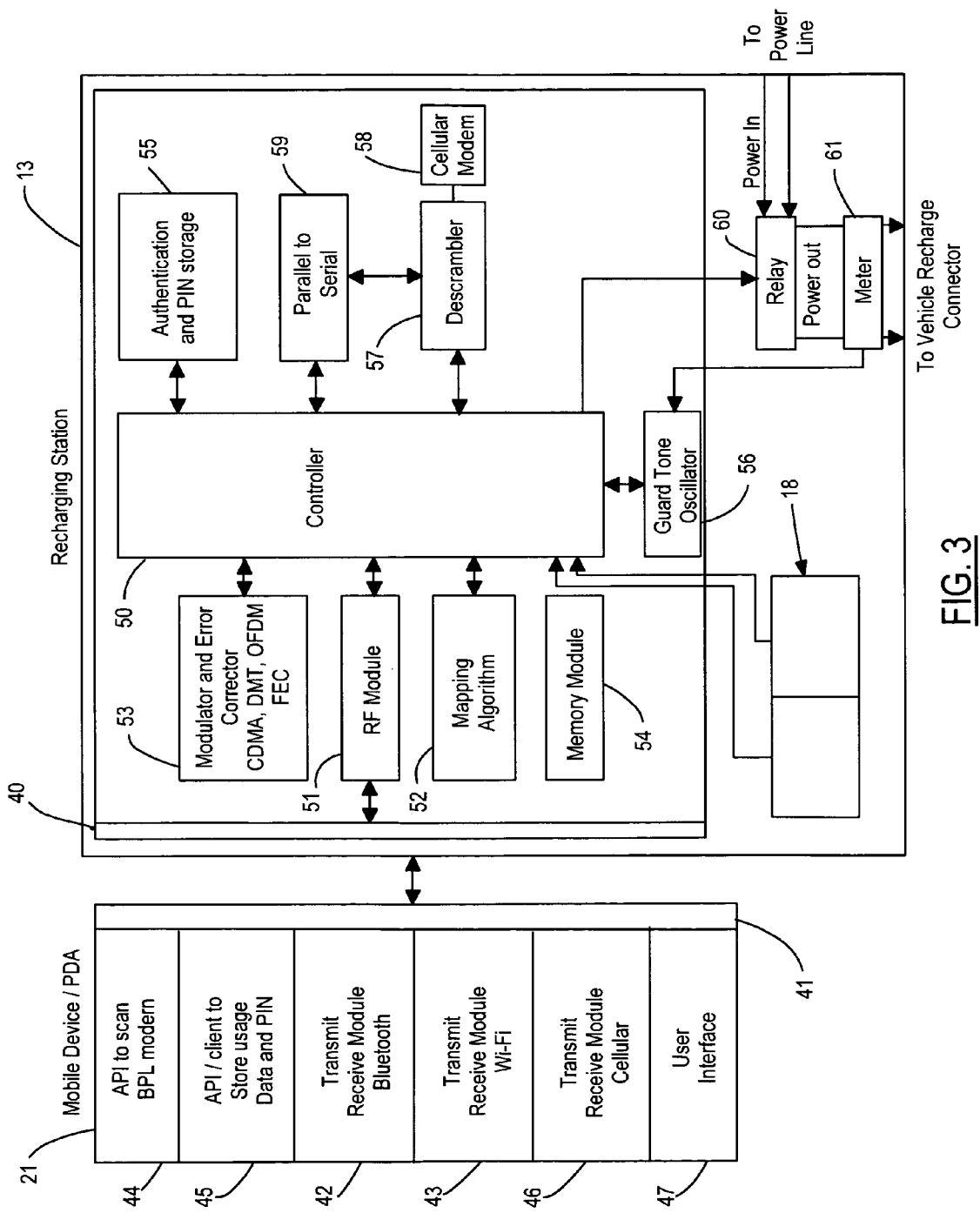
FIG. 3 is a block diagram showing portions of a recharging station and a mobile device in greater detail.

FIG. 3 is a block diagram of mobile handset 21 and recharging station 13 showing details of the elements relevant to the present invention. Recharging station 13 has a first local wireless interface 40 and mobile handset 21 includes a second local wireless interface 41. The local wireless interface may be comprised of a Bluetooth connection or a Wi-Fi connection, for example. Accordingly, mobile handset 21 includes a Bluetooth transmit/receive module 42 and a Wi-Fi transmit/receive module 43. Interfaces 40 and 41 can also be implemented over a wide-area method such as GSM, GPRS, CDMA, WiMAX, or LTE, for example.

Mobile handset 21 further includes an application program interface (API) 44 for scanning the local wireless interface for the recharging station. When in a search mode and when more than one recharging station is discovered, any one may be selected according to unique identifiers contained in the respective signals from the recharging stations. Once a recharging station is identified, API 44 generates an authentication request and analyzes any returned authentication data and activates the recharging station as necessary. Mobile handset 21 further includes an API 45 with a client for storing usage data and the PIN code so that the user can keep track of all of their transactions. In addition, API 45 may store utility rates in order to calculate the costs of each recharge based on the usage data measured by the recharging station. Mobile handset 21 further includes a cellular transmit/receive module 46 for conventional operation as a cellular phone, and a user interface 47 for displaying is prompts and data to the user and to accept input actions from the user.

Recharging station 13 has a controller 50 which may be comprised of a state machine for defining each operational function of recharging station 13. Controller 50 is coupled to an RF module 51 which may preferably include Bluetooth and Wi-Fi transceivers for wireless interface 40. A mapping algorithm 52 is coupled to RF module 51 and controller 50 for encoding and decoding messages exchanged between recharging station 13 and mobile device 20/21. A modulator and error corrector 53 is also coupled to RF module 51 and controller 50 for processing Bluetooth/Wi-Fi/BPL communication signals as known in the art. A memory module 54 is provided in recharging station 13 to retain firmware and software supporting each of the other elements. Additional storage 55 is provided for storing authentication data and PIN code data used in various recharging transactions. A guard tone oscillator 56 is coupled to controller 50 for providing basic clock signals.

A descrambler 57 couples controller 50 to a cellular modem 58. A parallel to serial converter 59 is coupled between descrambler 57 and controller 50. This wide-area interface to the front-end server can be comprised of any conventional wireless communication including CDMA, TDMA, GSM, UMTS, WiMAX, and EVDO.

A power relay 60 is coupled to controller 50 so that electric power may be selectively metered to the power outputs of recharging station 13. A power usage meter 61 is connected to controller 50 for reporting the kilowatt-hours consumed during each recharging transaction.

Figure 4:
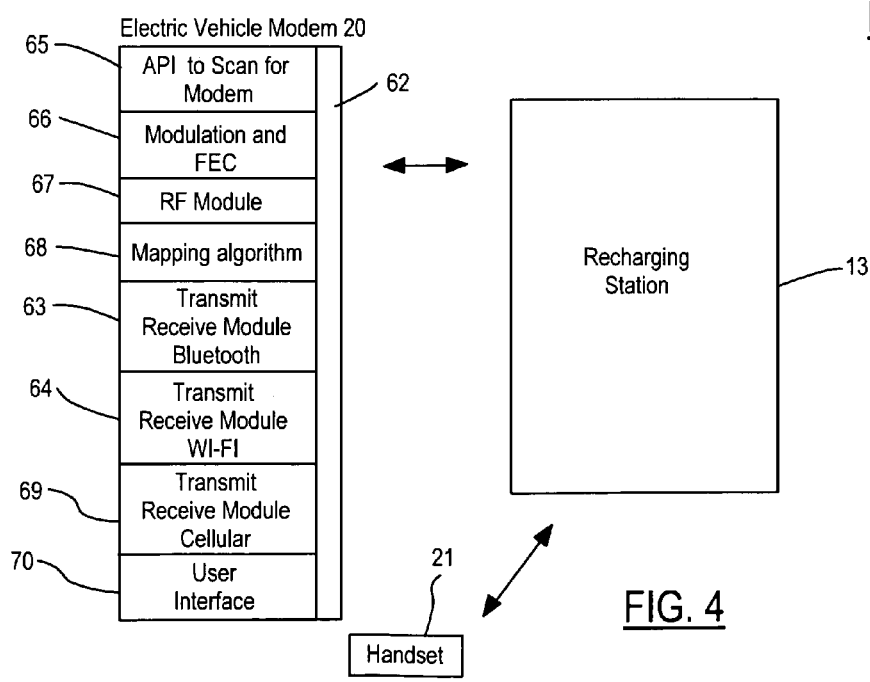
FIG. 4 is a block diagram showing a vehicle-mounted transceiver.

FIG. 4 shows vehicle-mounted user transceiver 20 in greater detail. Transceiver 20 is a modem with a local wireless interface 62 which may be comprised of a Bluetooth or Wi-Fi connection. Accordingly, a Bluetooth transmit/receive module 63 and a Wi-Fi transmit/receive module 64 are provided. Transceiver 20 includes an API 65 for scanning the local wireless interface for the recharging station. The modulation and forward error correction block 66, RF module, and a mapping algorithm 68 perform function similar to corresponding blocks in recharging station 13. Transceiver 20 further includes a cellular transmit/receive module 69, and a user interface 70 for displaying prompts and data to the user and to accept input actions from the user. As shown in FIG. 4, vehicle-mounted transceiver 20 can operate in tandem with handset 21 by dividing certain ones of the relevant functions. Alternatively, vehicle-mounted transceiver 20 can function on a standalone basis (e.g., by including an additional API for managing the usage data and a PIN code).

Figure 5:
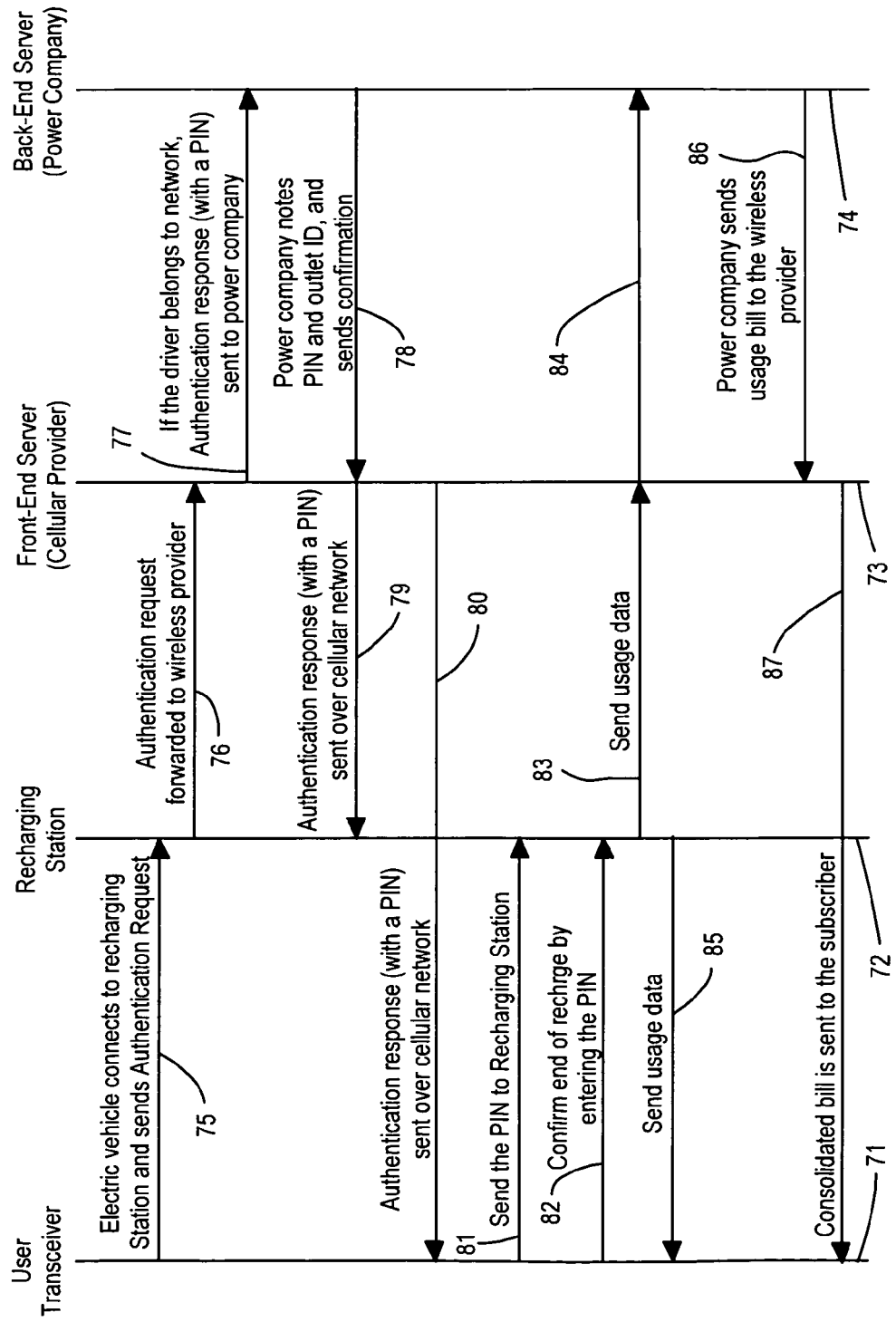
FIG. 5 is a call flow diagram for a preferred embodiment.

A preferred embodiment of the invention is summarized according to the call flow shown in FIG. 5. Vertical line 70 represents the mobile user transceiver, vertical line 72 represents the recharging station, vertical line 73 represents the front-end server, and vertical line 74 represents the back-end server. In transaction 75, the user transceiver scans for local wireless signals such as Bluetooth to discover the recharging station and, upon discovery, sends an authentication request including an identification of the user transceiver. In transaction 76, the authentication request is forwarded to the wireless provider's network with a destination address corresponding to the front-end server. The front-end server analyzes the authentication request and if the user belongs to the cellular provider's network, then an authentication response including a PIN code generated by the front-end server for the transaction is sent to the power company back-end server in transaction 77. If the user belongs to a different cellular provider's network, then the other cellular provider is first contacted in order to obtain authentication data.

In transaction 78, the power company back-end server notes the PIN code and the identifier of the recharging station and then sends a confirmation to the front-end server. An authentication response containing the PIN code is sent over the cellular network to the recharging station in transaction 79. Likewise, an authentication response with the PIN code is sent over the cellular network to the user transceiver in transaction 80. If the user transceiver determines that the authentication response is valid, then it sends the PIN code to the recharging station in transaction 81. The recharging station initiates charging and monitors usage during recharging of the electric vehicle.

At the end of the recharge, completion of charging can be confirmed by either the user transceiver or the recharging station sending the PIN code over the local wireless interface to the other. With charging completed, the recharging station sends usage data including the PIN code to the front-end server in transaction 83. The front-end server forwards the usage data to the back-end server in transaction 84. In addition, the recharging station sends the usage data to the user transceiver in transaction 85.

Having received the usage data, the power company sends a usage bill from the back-end server to the front-end server in transaction 86. The wireless provider consolidates billings from the power company together with billings for usage of cellular services and sends a consolidated bill to the cellular subscriber (i.e., the user) in transaction 87. Thus, the user has the convenience of utilizing a easy-to-operate recharging station with payment automatically being added to their phone bill.

Referring to FIG. 6, a 3G and 4G wireless architecture is shown which can provide the wide-area wireless links between the user transceiver and the front-end server and between the recharging station and the front or back-end servers. The cellular provider has a base transceiver station 88 for serving wireless devices of the user and of the recharging station such as a smart phone 89 (e.g., a PDA phone), a broadband data card 90 (e.g., an EVDO modem attached to a personal computer), and a WiMAX modem. Data packets to and from the wireless device traverse a backhaul channel 92 connected to an edge-core router 93 (via an access service network (ASN) gateway 99) in the cellular provider's core network. Device authentication is performed by a foreign agent 94, home agent 95, and AAA server 96 in order to grant access to application servers 97 (which may include the front-end server). External server farms 98 can also be connected to backhaul channel 92 for either the front-end server or the back-end server.

What is claimed is:

1. A system for recharging an electric vehicle, comprising:
   a recharging station having a fixed transceiver operable with a local interface and a wide-area wireless interface, wherein the wide-area wireless interface corresponds to a cellular network provider, and wherein the recharging station has a controllable output for selectably metering electrical power from a powerline of a utility provider to the electric vehicle for recharging;
   a user transceiver operable with the local interface and the wide-area wireless interface, wherein the user transceiver is activated by a user when desiring to recharge the electric vehicle to send an authentication request to the recharging station via the local interface, wherein the authentication request identifies the user transceiver;
   a front-end server within a core network of the cellular network provider adapted to communicate with the recharging station and the user transceiver via the wide-area wireless interface, wherein the recharging station forwards the authentication request with an identification of the recharging station to the front-end server, and wherein the front-end server creates a PIN code in response to the authentication request if the identification of the user transceiver is verified; and
   a back-end server associated with the utility provider having a network interface with the front-end server for receiving the PIN code, wherein the back-end server verifies the identification of the recharging station and sends a confirmation to the front-end server;
   wherein the front-end server sends the PIN code to both the user transceiver and the recharging station via the wide-area wireless interface;
   wherein the user transceiver forwards the PIN code to the recharging station via the local interface; and wherein when the recharging station compares the PIN code received from the user transceiver with the PIN code received from the front-end server, and if they match then it initiates charging of the electric vehicle.

2. The system of claim 1 wherein the recharging station monitors an amount of electrical consumption used in recharging the electric vehicle and transmits the amount to the user transceiver at the completion of charging.

3. The system of claim 1 wherein the recharging station monitors an amount of electrical consumption used in recharging the electric vehicle and transmits the amount to the front-end server and back-end server at the completion of charging.

4. The system of claim 3 wherein the cellular network provider bills the cost of the amount of electrical consumption together with a bill for service by the wide-area wireless interface.

5. The system of claim 1 wherein the user transceiver is comprised of a mobile handset.

6. The system of claim 1 wherein the user transceiver is vehicle mounted.

7. The system of claim 1 wherein the local interface is comprised of a wireless interface.

8. The system of claim 7 wherein the wireless interface is selected from the group consisting of Bluetooth and Wi-Fi.

9. The system of claim 1 wherein the wide-area wireless interface is selected from the group consisting of CDMA, TDMA, GSM, UMTS, WiMAX, and EVDO.

10. The system of claim 1 wherein the user transceiver is identified in the authentication request by at least one of an ESN, MDN, MSID, or MAC address.

11. A method of recharging an electric vehicle of a user at a recharging station having a fixed transceiver operable with a local interface and a wide-area wireless interface of a cellular network provider, wherein the recharging station receives electrical power from a utility provider, wherein the user has a user transceiver operable with the local interface and the wide-area wireless interface, wherein a core network of the cellular network provider includes a front-end server adapted to communicate with the recharging station and the user transceiver via the wide-area wireless interface, and wherein a back-end server associated with the utility provider has a network interface with the front-end server, the method comprising the steps of:

the user sending an authentication request from the user transceiver to the recharging station via the local interface when desiring to recharge the electric vehicle, wherein the authentication request identifies the user transceiver;

the recharging station forwarding the authentication request together with an identification of the recharging station to the front-end server;

the front-end server creating a PIN code in response to the authentication request if the identification of the user transceiver is verified;

the back-end server verifying the identification of the recharging station and sending a confirmation to the front-end server;

the front-end server sending the PIN code to both the user transceiver and the recharging station via the wide-area wireless interface;

the user transceiver forwarding the PIN code to the recharging station via the local interface;

the recharging station comparing the PIN code received from the user transceiver with the PIN code received from the front-end server; and if the PIN code received from the user transceiver matches the PIN code received from the front-end server then the recharging station initiating charging of the electric vehicle.

12. The method of claim 11 further comprising the steps of:
the recharging station monitoring an amount of electrical consumption used in recharging the electric vehicle; and
transmitting the amount to the user transceiver at the completion of charging.

13. The method of claim 11 further comprising the steps of:
the recharging station monitoring an amount of electrical consumption used in recharging the electric vehicle; and
transmitting the amount to the front-end server and back-end server at the completion of charging.

14. The method of claim 13 further comprising the steps of:
consolidating the cost of the amount of electrical consumption together with costs for service by the wide-area wireless interface; and
submitting a bill for the consolidated costs from the cellular network provider to the user.

15. The method of claim 11 wherein the user transceiver is comprised of a mobile handset.

16. The method of claim 11 wherein the user transceiver is vehicle mounted.

17. The method of claim 11 wherein the local interface is comprised of a wireless interface.

18. The method of claim 17 wherein the wireless interface is selected from the group consisting of Bluetooth and Wi-Fi.

19. The method of claim 11 wherein the wide-area wireless interface is selected from the group consisting of CDMA, TDMA, GSM, UMTS, WiMAX, and EVDO.

20. The system of claim 11 wherein the user transceiver is identified in the authentication request by at least one of an ESN, MDN, MSID, or MAC address.

* * * * *